(12) United States Patent
Case et al.

(10) Patent No.: US 10,275,944 B2
(45) Date of Patent: Apr. 30, 2019

(54) THREE DIMENSIONAL VISUALIZATION OF SYSTEM COMPONENTS AND DATA

(71) Applicant: International Business Machines Corporation, Armonk, NY (US)

(72) Inventors: Ronald A. Case, Sunnyvale, CA (US); Juan F. Garzon, Tampa, FL (US); Alexandru Z. Nagy, Gilroy, CA (US); Kaoru Stabnow, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 15/466,162

(22) Filed: Mar. 22, 2017

(65) Prior Publication Data

US 2018/0276872 A1 Sep. 27, 2018

(51) Int. Cl.
| | |
|---|---|
| *G06T 19/00* | (2011.01) |
| *G06T 11/60* | (2006.01) |
| *G05B 23/02* | (2006.01) |
| *G06Q 10/00* | (2012.01) |
| *G06F 17/30* | (2006.01) |
| *G06F 17/50* | (2006.01) |

(52) U.S. Cl.
CPC ...... *G06T 19/006* (2013.01); *G06F 17/30991* (2013.01); *G06F 17/50* (2013.01)

(58) Field of Classification Search
CPC ....... G06T 19/00; G06T 11/001; G06T 11/60; G06T 19/006; G06T 2207/30164; G06T 19/20; G09G 5/14; G05B 19/41875; G05B 23/0283; G06Q 10/20

USPC .............. 345/419, 581, 619, 629, 632, 633; 700/108, 109, 110

See application file for complete search history.

(56) References Cited

U.S. PATENT DOCUMENTS

| | | |
|---|---|---|
| 6,205,447 B1 | 3/2001 | Malloy |
| 8,082,239 B2 | 12/2011 | Yang et al. |
| 9,025,860 B2 | 5/2015 | Zweig et al. |
| 2001/0032222 A1* | 10/2001 | Takahashi ............. G06Q 10/06 715/255 |
| 2002/0128933 A1 | 9/2002 | Day et al. |
| 2009/0259440 A1* | 10/2009 | Reed ...................... G06F 17/50 703/1 |
| 2016/0004773 A1 | 1/2016 | Jannink et al. |
| 2016/0147880 A1 | 5/2016 | Scheibli et al. |

(Continued)

*Primary Examiner* — Ke Xiao
*Assistant Examiner* — Andrew Shin
(74) *Attorney, Agent, or Firm* — Ulysses Williams, III

(57) ABSTRACT

In an approach to three dimensional component visualization, one or more computer processors receive a request associated with one or more reference tags received from one or more requesting devices. The one or more computer processors identify component data associated with one or more requested reference tags. The one or more computer processors analyze the one or more three dimensional renderings of one or more components using component data. The one or more computer processors determine whether to augment the one or more three dimensional renderings. The one or more computer processors create an augmented three dimensional rendering using component data. The one or more computer processors send one or more three dimensional renderings of one or more components using component data to the one or more requesting devices.

18 Claims, 4 Drawing Sheets

(56) References Cited

U.S. PATENT DOCUMENTS

| | | | |
|---|---|---|---|
| 2016/0275079 A1* | 9/2016 | Kluckner | G06F 17/30047 |
| 2016/0343402 A1* | 11/2016 | Singhal | G11B 27/005 |
| 2017/0091375 A1* | 3/2017 | Lu | G06Q 10/20 |
| 2017/0091607 A1* | 3/2017 | Emeis | G06T 19/006 |
| 2017/0148102 A1* | 5/2017 | Franke | G06Q 10/20 |
| 2017/0293894 A1* | 10/2017 | Taliwal | G06Q 10/20 |

\* cited by examiner

THREE DIMENSIONAL VISUALIZATION OF SYSTEM COMPONENTS AND DATA

BACKGROUND OF THE INVENTION

The present invention relates generally to the field of three dimensional imaging, and more particularly to three dimensional visualization applied to systems analysis and repair.

Three dimensional (3D) visualization is any technique for creating images, diagrams, and/or animation using 3D modeling and representation to communicate a message, such as information. Visualization using 3D imaging techniques is an effective way to communication abstract and concrete ideas. For example, many technical drawings for scientific and engineering purposes are translated into 3D representations for the purposes of research, manufacturing, and general communication of information.

Visualization continues to expand into an ever increasing number of scientific, educational, engineering, interactive media, and medical applications. For example, the application of computer graphics to visualization allows engineers to engage in product visualization thereby quickening the pace of engineering applications such as manufacturing, repair, and simulation.

SUMMARY

Embodiments of the present invention disclose a method, a computer program product, and a system for three dimensional component visualization. The method may include one or more computer processors receiving a request associated with one or more reference tags received from one or more requesting devices. The one or more computer processors identify component data associated with one or more requested reference tags. The one or more computer processors analyze the one or more three dimensional renderings of one or more components using component data. The one or more computer processors determine whether to augment the one or more three dimensional renderings. The one or more computer processors create an augmented three dimensional rendering using component data. The one or more computer processors send one or more three dimensional renderings of one or more components using component data to the one or more requesting devices.

DETAILED DESCRIPTION

Present day component locating systems rely on service documentation and location codes to identify particular components in a device. More advanced component locating systems point to certain components by mechanisms such as turning on light emitting diodes on the component to be identified. Therefore, current technologies rely on active user directed inputs and participation to physically locate the correct components of a device. As such, component location systems can benefit from the integration of three dimensional (3D) visualization tied to vital product data in the field of engineering. Applying 3D visualization in component locating systems allows for significant improvements in the efficiency and accuracy of component location. Further, 3D visualization opens up possibilities in how devices are analyzed by expanding the capabilities of a user to include applications that look deeper into the mechanics of an individual component, assess how performance of a larger system changes when one component is replaced by another, and manipulate 3D representations of a device to better visualize a component in the given environment. For example, allowing a user to locate a device and learn about the product's specifications using a 3D representation rather than manually locating the components, identifying the component identification information, and locating the vital product data associated with the component simplifies the component location and identification process to passively complement a workflow rather than being a time and labor intensive endeavor. Embodiments of the present invention recognize that 3D component visualization tied to vital product data can complement present day engineering platforms by cutting steps and improving information flow in the engineering process. Implementation of embodiments of the invention may take a variety of forms, and exemplary implementation details are discussed subsequently with reference to the Figures.

Figure 1:
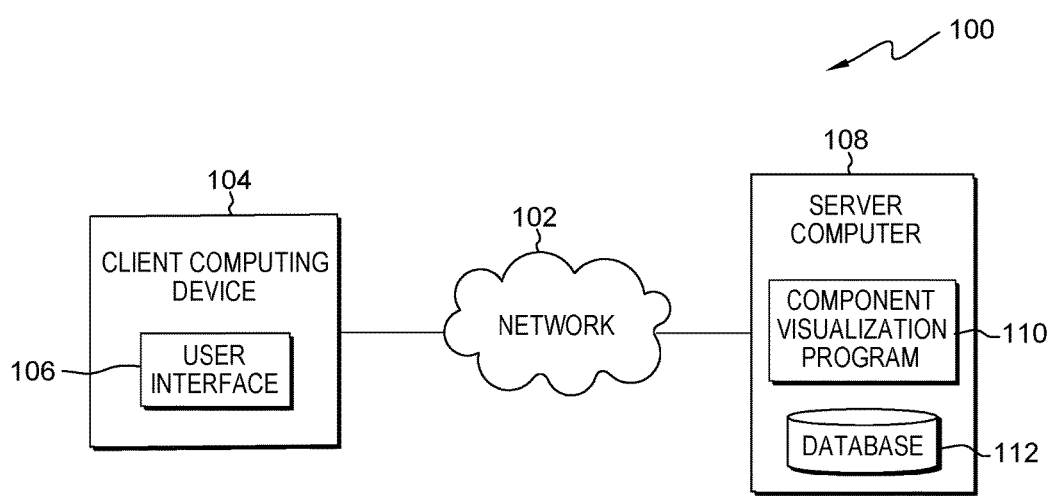
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104 and server computer 108, and other computing devices (not shown) within distributed data processing environment 100.

Client computing device 104 can be a smart watch, a smart television, a laptop computer, a tablet computer, a smart phone, or any programmable electronic device capable of capturing images, displaying 3D images, and communicating with various components and devices within distributed data processing environment 100, via network 102. Client computing device 104 may receive direct input from the user via user interface 106. Client computing device 104 may represent any programmable electronic device, pre-configured electronic device, or combination of programmable and pre-configured electronic devices capable of executing machine readable program instructions and communicating with computing devices, such as server computer 108, and other computing devices (not shown) within distributed data processing environment 100 via a network, such as network 102. In an embodiment, client computing device 104 may be limited to communicating with other computing devices (not shown) within distributed data processing environment 100 via a network, such as network 102. In the depicted embodiment, client computing device 104 includes an instance of user interface 106. In another embodiment, client computing device 104 does not include an instance of user interface 106.

User interface 106, hosted on client computing device 104, provides an interface to component visualization program 110 on server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. User interface 106 enables the user of client computing device 104 to register with and configure component visualization program 110 to adjust preferences for 3D imaging functions, such as which one or more databases 112 to access, the type of data stored for each component, and user-specific authorization to use component visualization program 110. Further, user interface 106 may enable a user to view 3D representations and vital product data of one or more components using augmented reality. By overlaying a 3D component image over an image or video captured by client computing device 104, component visualization program 110 can dynamically assist a user through real-time 3D visualization and analysis of component issues. For example, component visualization program 110 may manipulate the image overlay in augmented reality to show where a particular component failed or show how an alternative component would fit in the available space. However, user interface 106 is not limited to the aforementioned examples and may be used to control any parameters associated with component visualization program 110.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with client computing device 104 and other computing devices (not shown) within distributed data processing environment 100 via network 102. For example, server computer 108 may be a smart phone that is capable of remotely controlling and sending registration and configuration data to client computing device 104. In another embodiment, server computer 108 represents a computing system utilizing clustered computers and components (e.g., database server computers, application server computers, etc.) that act as a single pool of seamless resources when accessed within distributed data processing environment 100. Server computer 108 includes component visualization program 110 and database 112. Server computer 108 may include internal and external hardware components, as depicted and described in further detail with respect to FIGS. 3 and 4.

Component visualization program 110 executes a series of steps to link component data, such as 3D representations and vital product data, to one or more reference tags received from client computing device 104 and communicate the component data to a user via client computing device 104. Component visualization program 110 aims to streamline and automate much of the management of component data required to improve engineering-related functions by cutting information gathering steps and improving information flow to a user throughout the engineering process. For example, component visualization program 110 may save a user time and effort in assessing a component failure by organizing and linking component data of a broken component, such as 3D representation and vital product data, to a reference tag and sending the data to client computing device 104, thereby allowing a user to quickly receive component data and manipulate a 3D model of the component in a larger system. In another example, component visualization program 110 may save a user time and effort in quality control by sending a user requested component data, such as vital product data explaining known issues with a component and 3D representations of the component that may be visually overlaid and manipulated on one or more images of a malfunctioning device, of a component that is responsible for one or more inefficiencies, so the user can quickly identify alternative components that may improve the finished product.

In yet another embodiment, component visualization program 110 may communicate component data associated with a faulty component to client computing device 104 through user interface 106. For example, component visualization program 110 may create a 3D representation and send vital product data of a faulty component to user interface 106 on client computing device 104 which subsequently overlays the vital product data and the created 3D representation over one or more images or videos captured by client computing device 104 (i.e., augmented reality). In addition, component visualization program 110 may direct a user to a faulty component in the overall system and visually instruct the user on how to fix the issue upon receiving one or more signals via network 102 indicating a malfunction in one or more devices associated with one or more reference tags via user interface 106 on client computing device 104. The malfunction associated with one or more components which are associated with one or more reference tags may be reported by a user via user interface 106 on client computing device 104 or automatically by one or more devices.

To achieve the aforementioned functions, component visualization program 110 receives component data from one or more databases 112. Components may include any hardware present in a system. Component data may include 3D representations and vital product data of a component. Vital product data may include one or more serial numbers, one or more part numbers, historical component information, one or more location codes, and any other information associated with the component. Component data may be received for a specific component or a group of components associated with each other, such as power supplies, hard drives, random access memory, motherboards, graphics cards, and CPUs compatible with a type of computer. Component data may also be received from larger databases linked to component visualization program 110 that contain a large variety of component data associated with a large variety of components. Component data may be any data associated with one or more components, such as data associated with replacement, repair, enhancement, or any other application of component data. Component visualization program 110 stores component data in one or more databases. For example, component visualization program 110 may store 3D representation data in a first database and vital product data in a second database. After storing the component data, component visualization program 110 links the component data to one or more reference tags. For example, component visualization program 110 may link the 3D representation data and the vital product data to one or more reference tags associated with a component. Component visualization program 110 determines whether component visualization program 110 receives one or more requests associated with one or more reference tags.

For example, a user may manually input or scan one or more reference tags with client computing device 104 which are subsequently sent to component visualization program 110 as a request for data associated with the reference tag. If component visualization program 110 does not receive one or more requests associated with one or more reference tags, then component visualization program 110 returns to a default state of waiting to receive component data. If component visualization program 110 receives one or more requests associated with one or more reference tags, then component visualization program 110 locates the component data associated with the one or more reference tags. For example, component visualization program 110 may locate the 3D representation data and vital product data associated with the reference tag. Component visualization program 110 sends the component data to one or more requesting devices. Component visualization program 110 determines whether component visualization program 110 received subsequent component data associated with the one or more reference tags. If component visualization program 110 determines that component visualization program 110 received subsequent component data associated with the one or more reference tags, then component visualization program 110 stores the subsequent component data in one or more databases. If component visualization program 110 determines that component visualization program 110 did not receive subsequent component data associated with the one or more reference tags, then component visualization program 110 ends.

Database 112 is a repository for data used by component visualization program 110. In the depicted embodiment, database 112 resides on server computer 108. In another embodiment, database 112 may reside elsewhere within distributed data processing environment 100 provided component visualization program 110 has access to database 112. Database 112 can be implemented with any type of storage device capable of storing data and configuration files that can be accessed and utilized by server computer 108, such as a database server, a hard disk drive, or a flash memory. In some embodiments, database 112 may store any data that component visualization program 110 uses to store and locate component data. For example, database 112 may store parameters set by a user that give component visualization program 110 permission to store and locate component data associated with particular reference tags. In various embodiments, database 112 may store data received by component visualization program 110 and registration information including configuration data of component visualization program 110 and client computing device 104. Database 112 may also store previously created 3D renderings of previous issues and associated vital product data associated with one or more devices. Examples of registration data include, but are not limited to, data identifying user preferences for which reference tags component visualization program 110 may access. For example, a user may input user preferences that do not allow component visualization program 110 to access particular databases containing sensitive or confidential information. However, the aforementioned examples serve to illustrate a few scenarios, and the user preferences can be in the form of any restrictions and allowances a user may input.

Figure 2:
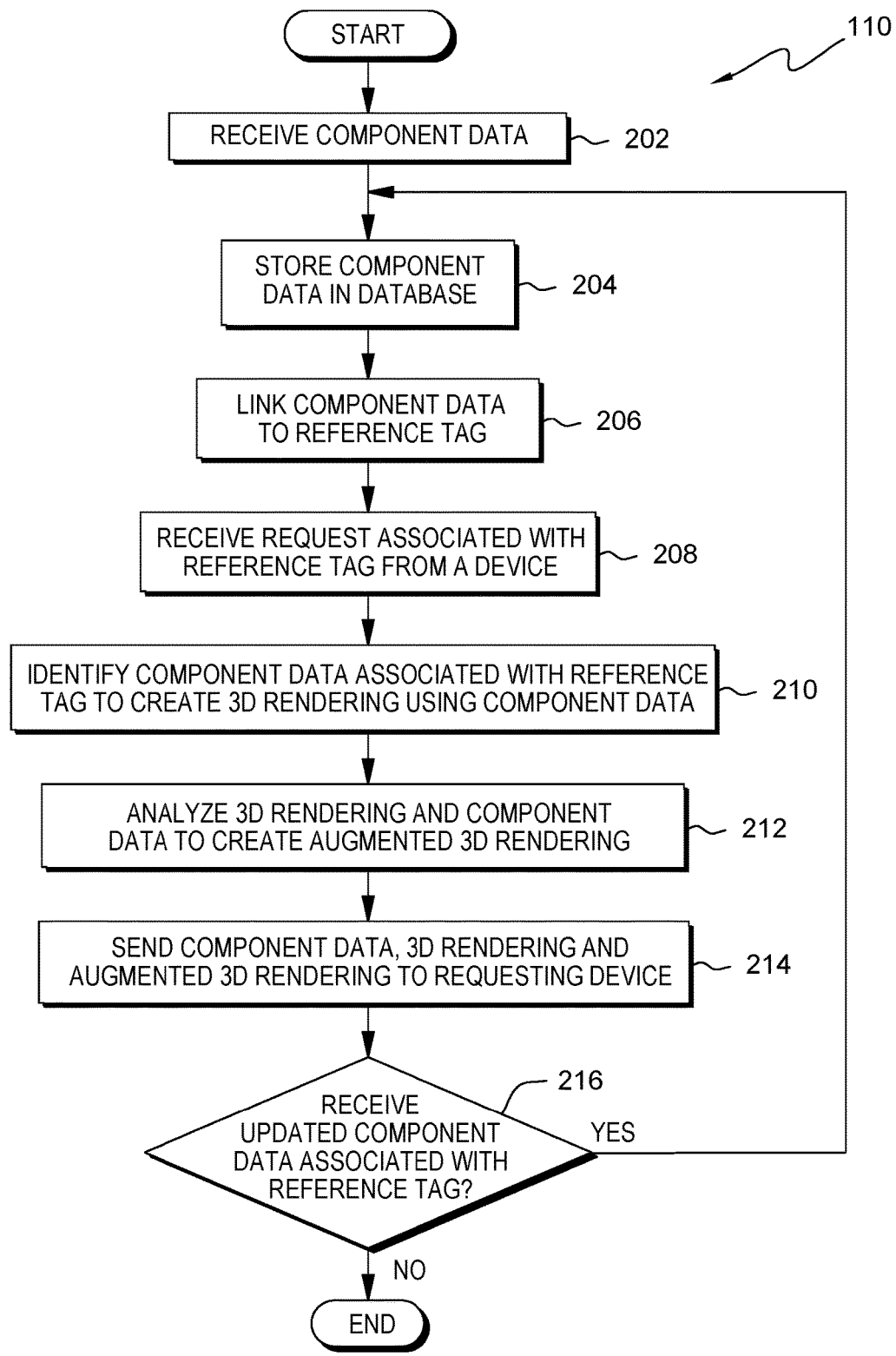
FIG. 2 is a flowchart depicting operational steps of a component visualization program, on a server computer within the distributed data processing environment of FIG. 1, for visualizing system components, in accordance with an embodiment of the present invention.

FIG. 2 depicts operational steps for storing component data and requesting component data using reference tags, on a computing device within the computing environment of FIG. 1, in accordance with an embodiment of the present invention. FIG. 2 is a flowchart depicting operations of an instance of component visualization program 110 on server computer 108 within distributed data processing environment 100. The operational steps of FIG. 2 begin when component visualization program 110 receives component data. FIG. 2 as described herein is based on the operational steps of component visualization program 110 located outside of client computing device 104. However, alternative embodiments and configurations may execute the operational steps of component visualization program 110.

Component visualization program 110 receives component data. (step 202). Component data may include vital product data and 3D representation data. Vital product data may include, but is not limited to, one or more serial numbers, one or more part numbers, and one or more location codes. 3D representation data allows a user to visually inspect one or more components in a 3D environment, such as a rendered 3D environment or a real 3D environment (i.e., augmented reality), and manipulate the 3D representation. The user may manipulate the viewing angles, run an animated model of one or more components in a system, and view the one or more components in an exploded view. Component visualization program 110 may receive vital product data and 3D representation data directly from one or more manufacturers, from accessing available materials on the internet, or from vital product data and 3D representation data inputted by one or more users. In an alternative embodiment, component visualization program may create one or more 3D renderings based on visual references, manufacturer specifications, and/or internet sources. However, a user is not limited to receiving, creating, or using 3D representation data and vital product data in the same way as illustrated aforementioned embodiments and accompanying examples.

Component visualization program 110 stores component data on one or more databases (step 204). In an embodiment, the component data comprising both the vital product data and 3D representation data may be stored on a singular database. In another embodiment, the vital product data and 3D representation data associated with a component may be stored on one or more databases. For example, component visualization program 110 may store 3D representation data in a database dedicated to imaging applications and store vital product data in an information database. By separating component data across multiple databases, separate restrictions may be placed on one or more databases, such as user access restrictions, which allows for a higher degree of control over the stored data. Further, separating component data across multiple databases may allow updates to particular parts the component data which may increase efficiency by avoiding an update of the entire data file when one or more changes are only made to a part of the overall component data. In an alternative embodiment, component visualization program 110 may access information from existing sources, such as manufacturer databases and internet databases, in order to conserve software and hardware resources associated with data storage. For example, component visualization program 110 may access a manufacturer webpage containing the specifications of one or more components for direct reference.

After storing the component data, component visualization program 110 links the component data to one or more reference tags (step 206). Reference tags associated with one or more databases containing data about one or more components allow component data to be aggregated efficiently. For example, if a 3D representation file on a first database and vital product data on a second database associated with the same component exist, then one reference tag associated with both files will allow a user to access both sets of data from separate databases using a common reference tag. In an embodiment, component visualization program 110 may use an Extensible Markup Language (XML) as a reference tag. In another embodiment, one component may have multiple reference tags if the component is used in multiple devices. For example, a general purpose hard drive may be used in multiple devices. Reference tags specific to each device would allow all the relevant components to a particular device to be pulled simultaneously from one or more databases. By linking components to one or more reference tags, component visualization program 110 would need access to significantly fewer databases rather than a database pertaining to each separate device. However, component visualization program 110 may use any method to tag data.

Component visualization program 110 receives requests from one or more client computing devices, wherein the one or more requests are associated with one or more reference tags (step 208). In an embodiment, a user of client computing device 104 may scan a reference tag using client computing device 104 to send a request over network 102 to component visualization program 110. Component visualization program 110 receives the request associated with the one or more reference tags. For example, a user of a smart phone may scan a barcode associated with a component in a car which is subsequently sent to component visualization program 110 as a request associated with a reference number. In another embodiment, a user of client computing device 104 may manually input a reference tag using user interface 106 located on client computing device 104 to send a request over network 102 to component visualization program 110. As with the prior example, component visualization program 110 receives the request associated with the one or more reference tags. For example, a user of a smart phone may input a reference tag located on a hard drive in a main frame computer into an application on the smartphone. A request is subsequently sent to component visualization program 110 associated with the inputted reference tag. In yet another embodiment, a user may input multiple reference tags associated with one or more components which is then received as a request by component visualization program 110. For example, a user may input reference tags for a hard drive, a CPU, and a power supply which is received as a request for each of the reference tags by component visualization program 110.

Component visualization program 110 locates the component data associated with the one or more reference tags to create a three dimensional rendering (step 210). In an embodiment, component visualization program 110 accesses a database containing both vital product data and 3D representation data associated with one or more reference tags. For example, component visualization program 110 may locate a file on a database associated with a reference tag for a hard drive containing both the 3D representation data and vital product data, such as the serial number, part number, and location code associated with the hard drive. In another embodiment, component visualization program 110 may access a first database containing vital product data and a second database containing 3D representation data associated with one or more reference tags. For example, component visualization program 110 may locate a first file on the first database containing a serial number, location code, and part number and locate a second file on the second database containing 3D representation data for a reference tag associated with a hard drive. In yet another embodiment, component visualization program 110 may access one or more databases to locate more than one sets of component data associated with multiple reference tags.

Following the locating of the component data associated with one or more reference tags, component visualization program 110 creates a three dimensional rendering using the component data. In an embodiment, component visualization program 110 uses 3D representation data, such as an XML file, and vital product data to render a 3D model of the one or more components of interest. Further, component visualization program 110 renders one or more 3D models of one or more components associated or interconnected with the one or more components of interest to create a 3D rendering of a larger system of related components. For example, component visualization program 110 may create a 3D rendering of a problematic piston in an engine block and also render the rest of the components in the engine block to allow a user to see a 3D rendering of a functioning engine block. In a related example, component visualization program 110 may overlay one or more 3D renderings of one or more components of interest and one or more associated components on an image or a video to mix the 3D rendering in the actual environment. In another embodiment, component visualization program 110 may create a 3D rendering using data pulled from manufacturer databases, internet resources, and visual references of a component. In yet another embodiment, component visualization program 110 may show a user historical component information, such as information regarding past configurations of the components and accompanying 3D models. For example, a user may request and receive a 3D model and information about a component used in a previous iteration of the system, such as a mainframe computer. In yet another embodiment, component visualization program 110 may make x-ray views, subcomponent views, and time lapse views of one or more 3D models in a larger system available to one or more users. For example, component visualization program 110 may make an augmented 3D rendering of an iteration of a system one year prior and display information regarding the components, such as an augmented three dimensional rendering, created by component visualization program 110 during the designated time frame. As a result, a user may gain insight into why particular decisions were made regardless of a change in the user working with the system. By rendering a 3D model of one or more components and creating systems model that can be manipulated, component visualization program 110 allows a user to quickly visualize faulty components, locate inefficient components, and/or manipulate 3D renderings of one or more components to better visualize how existing systems function.

Component visualization program 110 analyzes the component data and one or more 3D component renderings to create one or more augmented three dimensional renderings (step 212). An augmented three dimensional rendering may be any analysis of one or more components in one or more 3D environments. For example, augmented three dimensional renderings may focus on repair instructions, component efficiency reports, and system modification based on component data and 3D component renderings. In essence, augmented three dimensional renderings augment the ability of one or more users to assess the viability of any system and to address any anticipated changes in the efficiency of the system. In one embodiment, component visualization program 110 creates an augmented three dimensional rendering that assesses how a component and all moving parts within the component and all subcomponents will function in a system to find potential vulnerabilities or inefficiencies in a user proposed system. As a result, component visualization program 110 compiles a set of repair and modification instructions that illustrate how to repair likely future breakdowns and propose modifications to the system with known components to increase the viability of the system over time. In another embodiment, component visualization program 110 may analyze how the 3D components using vital product data, such as subcomponent durability and heat tolerances, will function at present and over time to create component efficiency reports. As a result, one or more users may determine a repair or modification schedule based on the life span of the one or more components in a system.

Component visualization program 110 sends the component data, one or more 3D renderings, and one or more augmented three dimensional renderings to one or more requesting devices (step 214). In an embodiment, component visualization program 110 sends the component data to a mobile computing device, such as a smart phone. A user may view and manipulate 3D visual representations of the component and view information associated with the component on a smart phone. In another embodiment, component visualization program 110 may send the component data associated with one or more reference tags to one or more devices. For example, component visualization program 110 may send 3D representation data and vital product data to the laptop computer, smart phone, and desktop computer of each member of a five-person team. In yet another embodiment, component visualization program 110 send the component data to a camera-enabled requesting device, such as a camera-enabled smart phone, a camera-enabled tablet computer, and a camera-enabled laptop computer.

Component visualization program 110 determines whether component visualization program 110 received subsequent component data associated with the one or more reference tags. (decision block 216). In an embodiment, component visualization program 110 may receive subsequent component data associated with the one or more reference tags after any changes are made to the hardware. For example, a team debugging the manufacturing process of a main frame computer may replace a hard drive with a new hard drive, swap a power supply with a more powerful one, and move the motherboard to a new location. When the team makes changes to the system and logs them using smart phones and laptops, component data associated with the changes may be sent to component visualization program 110. In another embodiment, the component or device itself may send the changes to component visualization program 110. Component visualization program 110 may then determine the changes by comparing the original component data with the manipulated component data. Users may also directly note any changes made to the component data in one or more client computing devices 104 and choose to send the subsequent component data to component visualization program 110.

Responsive to component visualization program 110 determining that component visualization program 110 received subsequent component data associated with the one or more reference tags ("Yes" branch, decision block 216), component visualization program 110 stores the subsequent component data in one or more databases (step 204). In an embodiment, component visualization program 110 may store the subsequent component data to one database containing both 3D representation data and vital product data. In another embodiment, component visualization program 110 may store the subsequent component data to a first database for storing vital product data and a second database for storing 3D representation data.

Responsive to component visualization program 110 determining that component visualization program 110 did not receive subsequent component data associated with the one or more reference tags ("No" branch, decision block 216), component visualization program 110 ends.

Figure 3:
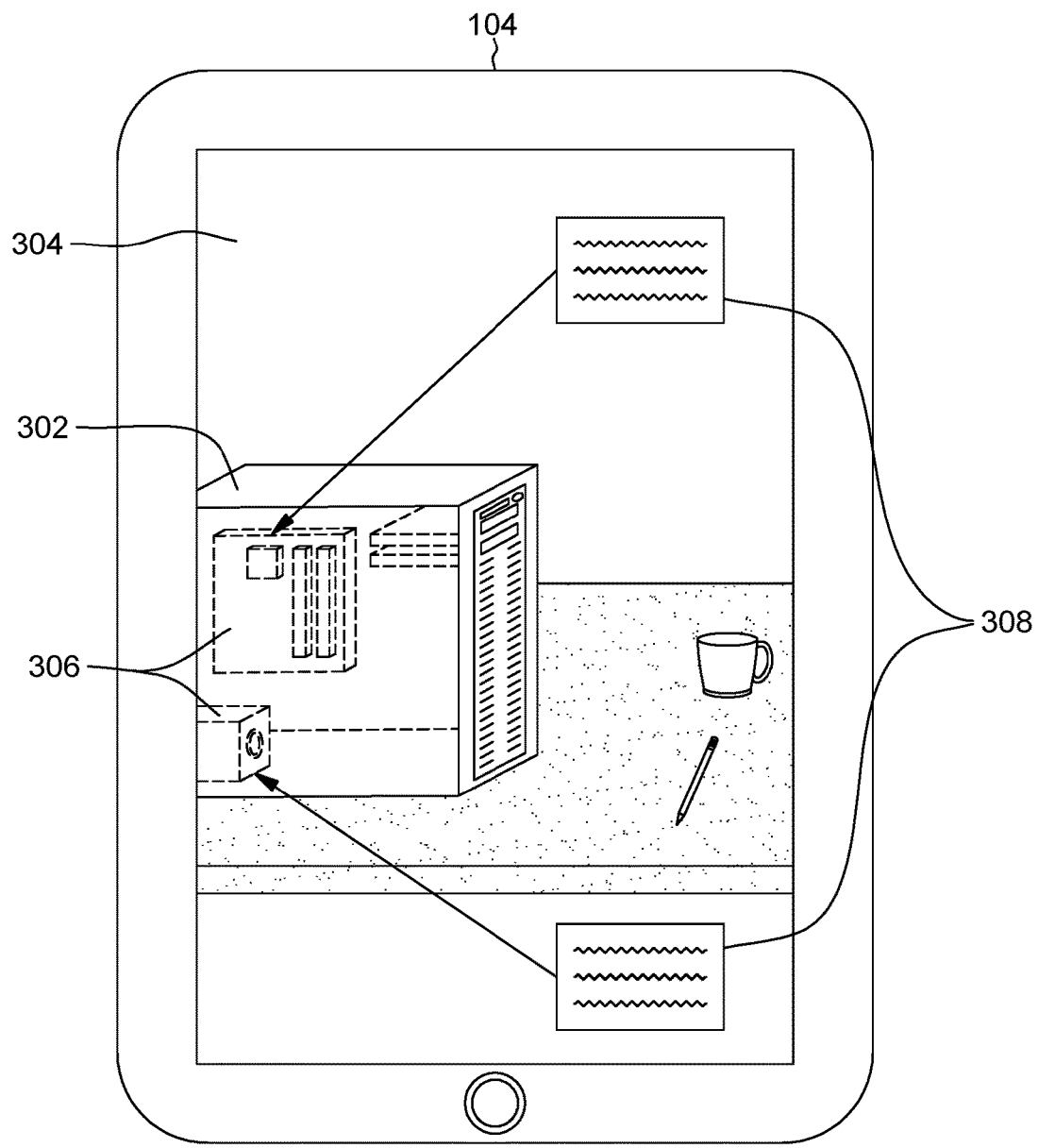
FIG. 3 depicts component visualization program running on a client computing device, in accordance with an embodiment of the present invention.

FIG. 3 depicts component visualization program 110 running on client computing device 104, in accordance with an embodiment of the present invention. In the depicted embodiment, client computing device 104 captures and displays an image 304 of device 302. Component visualization program 110 analyzes device 302 from a video feed received from client computing device 104 and the existing components of device 302 via visual cues, manual input from a user through user interface 106 on client computing device 104, and/or any other method of registering the existing components of device 302 with component visualization program 110. Client computing device 104 overlays 3D renderings of components 306 created by component visualization program 110 subsequent to analysis, such as missing components, user-requested components, and any other component of interest. Further client computing device 104 overlays vital product data 308 pulled from one or more databases by component visualization program 110, such as repair instructions, installation instructions, and replacement instructions.

For example, client computing device 104 may capture and display images in substantially real-time (i.e., streaming video) of a computer tower. Component visualization program 110 may receive one or more user-inputted references (i.e., serial numbers, component names, and component types). After analyzing the one or more user-inputted references, component visualization program 110 creates a 3D rendering of the components 306 and overlays the 3D renderings of the components 306 of the components on the streaming video of the computer tower in relation to the current position of the camera on client computing device 104 relative to the device 302 and the vital product data 308 on client computing device 104.

In another embodiment, component visualization program 110 may create animated 3D renderings of the components 306 of one or more components in a particular environment. For example, component visualization program 110 may show how a cooling fan moves in relation to other components in the environments and display potential obstructions, such as wires, to cooling fan movement. In yet another embodiment, component visualization program 110 may create 3D renderings of sub-components within 3D renderings of the components 306 of one or more components in a particular environment. For example, component visualization program 110 may render the screws, motors, and internal wiring of one or more cooling fans. As a result, a user of client computing device 104 can see into a cooling fan by manipulating 3D renderings through user interface 106 on client computing device 104 by requesting a semi-transparent view of one or more 3D renderings of the components 306 one or more components or requesting an exploded view of one or more 3D renderings of the components 306 one or more components. In yet another embodiment, client computing device 104 may display a completely 3D rendered image without overlaying 3D renderings of the components 306 over image 304.

Figure 4:
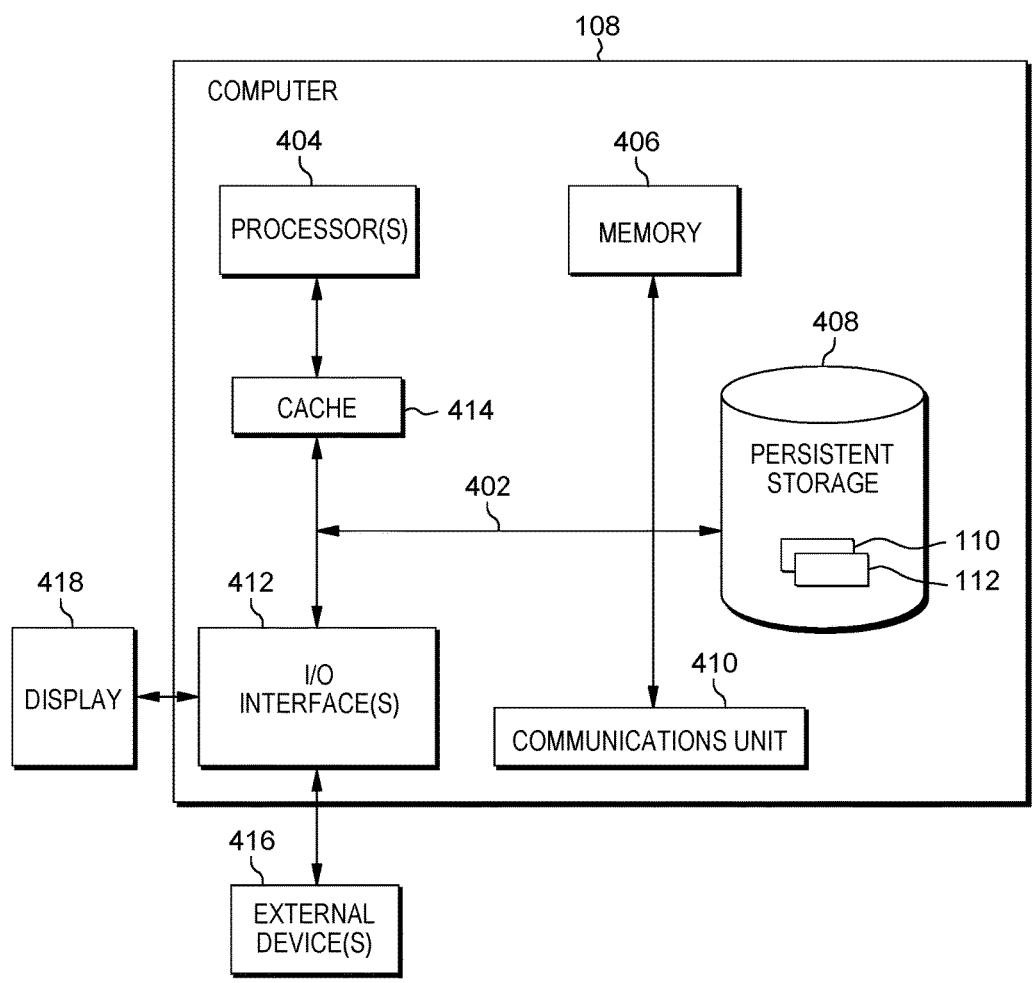
FIG. 4 depicts a block diagram of components of the server computer executing the component visualization program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., component visualization program 110 and database 112, are stored in persistent storage 408 for execution and/or access by one or more of the respective processor(s) 404 of server computer 108 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. component visualization program 110, database 112, and other programs and data used for implementation of the present invention, may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., component visualization program 110 and database 112 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for visualizing components in a system, the method comprising:

receiving, by one or more computer processors, a request associated with one or more reference tags received from one or more requesting devices;

identifying, by the one or more computer processors, component data associated with the one or more reference tags;

analyzing, by the one or more computer processors, one or more three dimensional renderings of one or more components using the component data, wherein the analysis incorporates the component data to predict viability of an overall system;

determining, by the one or more computer processors, to augment the one or more three dimensional renderings, wherein the determining incorporates identifying one or more alternative components that are of a different type than the one or more components;

responsive to determining to augment the one or more three dimensional renderings, creating, by the one or more computer processors, a manipulatable augmented three dimensional rendering using the component data, wherein the manipulatable augmented three dimensional renderings are created from previous time lapsed iterations of the one or more components during a designated time frame; and sending, by the one or more computer processors, the manipulatable augmented three dimensional renderings to the one or more requesting devices.

2. The method of claim 1, further comprising:

receiving, by one or more computer processors, the component data, wherein:

the component data is a three dimensional representation of a system; and the component data is used to generate an animated model of one or more components in the system;

storing, by the one or more computer processors, the component data in one or more databases, wherein:

the component data is separated across multiple databases; and particular portions of the component data are updated in separate databases when changes are made to the system; and linking, by the one or more computer processors, the component data to the one or more reference tags.

3. The method of claim 1, further comprising:

determining, by the one or more computer processors, whether the component data has been updated to create subsequent component data;

sending, by the one or more computer processors, the subsequent component data to one or more requesting devices;

determining, by the one or more computer processors, whether subsequent component data associated with the one or more reference tags is received; and responsive to determining that the subsequent component data associated with the one or more reference tags is received, storing, by the one or more computer processors, the subsequent component data associated with the one or more reference tags in the one or more databases.

4. The method of claim 1, wherein the component data is selected from a group consisting of: three dimensional representations, vital product data, and historical component information.

5. The method of claim 1, wherein the one or more requesting devices are selected from a group consisting of: one or more camera-enabled smart phones, one or more camera-enabled laptop computers, and one or more camera-enabled tablet computers.

6. The method of claim 1, wherein determining whether to augment the one or more three dimensional renderings further comprises:

identifying, by the one or more computer processors, one or more inefficiencies in the one or more components using the component data;

determining, by the one or more computer processors, an alternative component from a plurality of different types of alternative components in one or more databases;

analyzing, by the one or more computer processors, whether anticipated changes in efficiency of a system associated with the one or more alternative components produce an improved alternative system based on a projected component efficiency from one or more component efficiency reports;

compiling, by the one or more computer processors, one or more sets of instructions for repair, modification, and replacement associated with the one or more alternative components and generating, by one or more processors, a repair schedule based on a life span of the alternative component.

7. The method of claim 1, wherein the one or more three dimensional renderings of the one or more components is created using an extensible markup language file.

8. A computer program product for visualizing components in a system, the computer program product comprising:

one or more computer readable tangible storage media, wherein the one or more computer readable tangible storage media are not transitory signals per se, and program instructions stored on the one or more computer readable tangible storage media, the program instructions readable/executable by one or more computer processors and further comprising:

program instructions to receive a request associated with one or more reference tags received from one or more requesting devices;

program instructions to identify component data associated with one or more reference tags;

program instructions to analyze one or more three dimensional renderings of one or more components using component data, wherein the analysis incorporates the component product data to predict the viability of an overall system;

program instructions to determine to augment the one or more three dimensional renderings, wherein the determining incorporates identifying one or more alternative components that are of a different type than the one or more components;

responsive to determining to augment the one or more three dimensional renderings, program instructions to create a manipulatable augmented three dimensional rendering using the component data, wherein the manipulatable augmented three dimensional renderings are created from previous time lapsed iterations of the one or more components during a designated time frame; and program instructions to send one or more manipulatable augmented three dimensional renderings to the one or more requesting devices.

9. The computer program product of claim 8, further comprising:

program instructions to receive the component data, wherein:

the component data is a three dimensional representation of a system; and the component data is used to generate an animated model of one or more components in the system;

program instructions to store the component data in one or more databases, wherein:

the component data is separated across multiple databases; and particular portions of the component data are updated in separate databases when changes are made to the system; and program instructions to link the component data to one or more reference tags.

10. The computer program product of claim 8, further comprising:

program instructions to determine whether the component data has been updated to create subsequent component data;

program instructions to send the subsequent component data to one or more requesting devices;

program instructions to determine whether subsequent component data associated with the one or more reference tags is received; and responsive to determining that the subsequent component data associated with the one or more reference tags is received, program instructions to store the subsequent component data associated with the one or more reference tags in the one or more databases.

11. The computer program product of claim 8, wherein the component data is selected from a group consisting of: three dimensional representations, vital product data, and historical component information.

12. The computer program product of claim 8, wherein the one or more requesting devices are selected from a group consisting of: one or more camera-enabled smart phones, one or more camera-enabled laptop computers, and one or more camera-enabled tablet computers.

13. The computer program product of claim 8, wherein determining whether to augment the one or more three dimensional renderings further comprises:

program instructions to identify one or more inefficiencies in the one or more components using the component data;

program instructions to determine an alternative component from a plurality of different types of alternative components in one or more databases;

program instructions to analyze whether anticipated changes in efficiency of a system associated with the one or more alternative components produce an improved alternative system based on a projected component efficiency from one or more component efficiency reports;

program instructions to compile one or more sets of instructions for repair, modification, and replacement associated with the one or more alternative components; and program instructions to generate a repair schedule based on a life span of the alternative component.

14. The computer program product of claim 8, wherein the one or more three dimensional renderings of the one or more components is created using an extensible markup language file.

15. A computer system for visualizing components in a system, the computer system comprising:

one or more computer processors;

one or more computer readable storage devices;

program instructions stored on the one or more computer readable storage devices for execution by at least one of the one or more computer processors, the stored program instructions comprising:

program instructions to receive a request associated with one or more reference tags received from one or more requesting devices;

program instructions to identify component data associated with one or more reference tags;

program instructions to analyze one or more three dimensional renderings of one or more components using component data, wherein the analysis incorporates the component product data to predict the viability of an overall system;

program instructions to determine to augment the one or more three dimensional renderings, wherein the determining incorporates identifying one or more alternative components that are of a different type than the one or more components;

responsive to determining to augment the one or more three dimensional renderings, program instructions to create a manipulatable augmented three dimensional rendering using the component data, wherein the manipulatable augmented three dimensional renderings are created from previous time lapsed iterations of the one or more components during a designated time frame; and program instructions to send one or more manipulatable augmented three dimensional renderings to the one or more requesting devices.

16. The computer system of claim 15, further comprising:

program instructions to receive the component data, wherein:

the component data is a three dimensional representation of a system; and the component data is used to generate an animated model of one or more components in the system;

program instructions to store the component data in one or more databases, wherein:

the component data is separated across multiple databases; and particular portions of the component data are updated in separate databases when changes are made to the system; and program instructions to link the component data to one or more reference tags.

17. The computer system of claim 15, further comprising:

program instructions to determine whether the component data has been updated to create subsequent component data;

program instructions to send the subsequent component data to one or more requesting devices;

program instructions to determine whether subsequent component data associated with the one or more reference tags is received; and responsive to determining that the subsequent component data associated with the one or more reference tags is received, program instructions to store the subsequent component data associated with the one or more reference tags in the one or more databases.

18. The computer system of claim 15, wherein determining whether to augment the one or more three dimensional renderings further comprises:

program instructions to identify one or more inefficiencies in the one or more components using the component data;

program instructions to determine an alternative component from a plurality of different types of alternative components in one or more databases;

program instructions to analyze whether anticipated changes in efficiency of a system associated with the one or more alternative components produce an improved alternative system based on a projected component efficiency from one or more component efficiency reports;

program instructions to compile one or more sets of instructions for repair, modification, and replacement associated with the one or more alternative components; and program instructions to generate a repair schedule based on a life span of the alternative component.

\* \* \* \* \*